United States Patent
Iwashita et al.

(10) Patent No.: US 9,048,733 B2
(45) Date of Patent: Jun. 2, 2015

(54) MOTOR DRIVING DEVICE HAVING REACTIVE CURRENT INSTRUCTION GENERATING UNIT

(75) Inventors: Yasusuke Iwashita, Yamanashi (JP); Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 199 days.

(21) Appl. No.: 13/595,042

(22) Filed: Aug. 27, 2012

(65) Prior Publication Data

US 2013/0099705 A1    Apr. 25, 2013

(30) Foreign Application Priority Data

Oct. 25, 2011 (JP) .................. 2011-234032

(51) Int. Cl.
| | |
|---|---|
| H02P 6/14 | (2006.01) |
| H02M 1/32 | (2007.01) |
| H02P 3/22 | (2006.01) |
| H02M 5/458 | (2006.01) |
| H02P 1/00 | (2006.01) |
| H02P 3/18 | (2006.01) |
| H02P 27/04 | (2006.01) |
| B60W 10/08 | (2006.01) |
| B60W 20/00 | (2006.01) |
| B60L 11/14 | (2006.01) |
| G01R 1/20 | (2006.01) |
| H02P 5/74 | (2006.01) |
| H02P 21/00 | (2006.01) |

(Continued)

(52) U.S. Cl.
CPC . H02M 1/32 (2013.01); H02P 3/22 (2013.01); H02P 5/74 (2013.01); H02P 21/0092 (2013.01); H02M 5/458 (2013.01); H02M 7/797 (2013.01); H02M 2001/008 (2013.01)

(58) Field of Classification Search
USPC ..................................... 318/400.22
See application file for complete search history.

(56) References Cited

U.S. PATENT DOCUMENTS

| | | | |
|---|---|---|---|
| 6,326,762 B1 * | 12/2001 | Jiang et al. | 318/811 |
| 7,081,734 B1 * | 7/2006 | Jadric et al. | 318/801 |
| 7,774,148 B2 * | 8/2010 | Welchko et al. | 702/41 |

(Continued)

FOREIGN PATENT DOCUMENTS

| | | |
|---|---|---|
| DE | 69901609 T2 | 11/2002 |
| EP | 1077527 A1 * | 2/2001 |

(Continued)

OTHER PUBLICATIONS

Japanese Office Action for U.S. Appl. No. 13/595,042 mailed Dec. 18, 2012.

(Continued)

*Primary Examiner* — Bentsu Ro
*Assistant Examiner* — Said Bouziane
(74) *Attorney, Agent, or Firm* — Lowe Hauptman & Ham, LLP (57) ABSTRACT

A motor driving device includes a converter that converts an input alternating current into a direct current, an inverter that inverts the direct current output by the converter into an alternating current for driving a motor, a voltage detecting unit that detects a voltage on a direct current output side of the converter, and a numerical control unit that causes the inverter to output a reactive current to increase electric power consumed in the motor, when the voltage detected by the voltage detecting unit exceeds a predetermined threshold.

4 Claims, 4 Drawing Sheets

(51) Int. Cl.
*H02M 7/797* (2006.01)
*H02M 1/00* (2006.01)

(56) References Cited

U.S. PATENT DOCUMENTS

| | | | |
|---|---|---|---|
| 2005/0248301 A1* | 11/2005 | Trifilo | 318/268 |
| 2006/0006829 A1* | 1/2006 | Anghel | 318/719 |
| 2006/0061320 A1* | 3/2006 | Ma et al. | 318/801 |
| 2007/0216343 A1* | 9/2007 | Rozman et al. | 318/811 |
| 2009/0243522 A1* | 10/2009 | Suhama et al. | 318/376 |
| 2010/0050703 A1* | 3/2010 | Maekawa et al. | 68/23 R |
| 2010/0067266 A1* | 3/2010 | Dommaschk et al. | 363/64 |
| 2010/0117568 A1* | 5/2010 | Iwashita et al. | 318/400.02 |
| 2013/0094258 A1* | 4/2013 | Royak et al. | 363/89 |
| 2013/0279214 A1* | 10/2013 | Takase et al. | 363/37 |

FOREIGN PATENT DOCUMENTS

| | | | |
|---|---|---|---|
| EP | 1487095 A1 * | 12/2004 | |
| JP | 7095775 A | 4/1995 | |
| JP | 2001161099 A * | 6/2001 | |
| JP | 2002084780 A * | 3/2002 | |
| JP | 3368930 B2 | 1/2003 | |
| JP | 3511173 B2 | 3/2004 | |
| JP | 2007151336 A | 6/2007 | |
| JP | 2009153308 A * | 7/2009 | |
| JP | 201051535 A | 3/2010 | |
| JP | 2010051535 A * | 3/2010 | |

OTHER PUBLICATIONS

Japanese Office Action for corresponding Patent Application No. 2011-234032 drafted Mar. 5, 2013.

* cited by examiner

FIG.6

MOTOR DRIVING DEVICE HAVING REACTIVE CURRENT INSTRUCTION GENERATING UNIT

RELATED APPLICATIONS

The present application is based on, and claims priority from, Japanese Application Number 2011-234032, filed Oct. 25, 2011, the disclosure of which is hereby incorporated by reference herein in its entirety.

BACKGROUND

1. Technical Field

The present invention relates to a motor driving device for controlling a motor, the motor driving device converting alternating current power from an alternating current power supply into direct current power, and then inverting the direct current power into alternating current power used as driving power for the motor. In particularly, the present invention relates to a motor driving device that can suppress generation of abnormal excessive voltage in a converter.

2. Description of Related Arts

In a machine tool system, a motor is provided for each drive shaft of a machine tool, and these motors are controlled and driven by a motor driving device. The motor driving device instructs each of the motors, on speed, torque or a rotor position of the motor, which are provided for driving the corresponding drive shafts of the machine tool. Thus, the motor driving device controls the motors.

The motor driving device has a converter and an inverter. The converter converts commercial three-phase alternating current power into direct current power. The inverter inverts the direct current power output by the convertor into alternating current power that has a desired frequency and that is used as driving power for the motor, or converts alternating current power regenerated by the motor into direct current power. The motor driving device controls speed, torque or rotor position of the motor connected on the alternating current side of the inverter.

The number of the provided inverters is the same as the number of motors. These inverters individually supply driving electric power to the motors provided for a plurality of drive shafts in a machine tool to control the motors. Meanwhile, in many cases, one converter is provided for a plurality of inverters in order to reduce the cost of the motor driving device or the occupied space.

When the motor driving device controls a speed of the motor to be lowered, the motor regenerates electric power. The regenerated electric power is returned to the side of the converter via the inverter. Thus, the inverter is configured as a semiconductor electric power converter, having the ability to not only invert direct current power into alternating current power, but also convert alternating current power into direct current power, in other words, capable of converting electric power from alternating current power to direct current power and vice versa.

Electric power regenerated by the motor at the time of control of decelerating the motor raises a voltage on the direct current output side of the converter. High regenerated electric power sharply raises a voltage on the direct current output side of the converter to generate an abnormal excessive voltage. As a result, the converter may be damaged.

In order to avoid generation of such an abnormal excessive voltage on the direct current output side of the converter, a regeneration resistor or a power supply regenerative circuit is additionally provided. The regeneration resistor is provided on the direct current output side of the converter. The regeneration resistor generates heat to consume the electric power corresponding to the raised amount of the voltage on the direct current output side. The power supply regenerative circuit returns regenerated electric power to the side of the alternating current power supply.

For example, as described in Japanese Patent Application Laid-Open Publication No. H07-95775, a inverter-protecting device is proposed. The inverter-protecting device calculates regenerated electric power level on the basis of an output voltage of the converter and a flowing direction of a direct current flowing into the inverter. If the regenerated electric power level exceeds a predetermined value, the inverter-protecting device makes electrical connection to the regeneration resistor so as to generate heat to consume the electric power corresponding to the raised amount of the direct current voltage. In this manner, the inverter-protecting device prevents the inverter from being damaged due to excessive voltage.

Depending on magnitude of motor inertia or a motor speed, an excessive current larger than a rated value is generated at the time of regeneration, so that the regeneration resistor may be damaged. For this reason, a regeneration-resistor-protecting circuit or the like is proposed, which shuts off a current flowing to the regeneration resistor at the time of generation of excessive voltage.

For example, as described in Japanese Patent No. 3511173, a regeneration-resistor-protecting mechanism is proposed. This mechanism shuts off a current flowing to the regeneration resistor from a capacitor connected between the output terminals of the converter, at the time of detecting an excessive current larger than a rated value of the regeneration resistor. At the same time, this mechanism also turns off an input control contactor that controls an alternating current input to the converter. Thereby, burnout of the regeneration resistor can be prevented.

As another example, as described in Japanese Patent No. 3368930, a servomotor regeneration processing circuit is proposed. This circuit calculates regenerated electric power on the basis of a current, a speed, torque and the like of a servomotor, calculates decelerating torque to decelerate the servomotor such that the regenerated electric power does not exceed allowable regenerated electric power. Thereby, it is possible to prevent the regeneration resistor, a transistor and the like from being burned out by excessive voltage.

In order to avoid generation of abnormal excessive voltage on the direct current output side of the converter, a regeneration resistor that generates heat to consume the electric power corresponding to a raised amount of a voltage on the direct current output side is additionally provided on the direct current output side of the converter, or a power supply regenerative circuit that returns regenerated electric power to the side of the alternating current power supply may be additionally provided. In this case, if the motor regenerates excessive electric power, it is necessary to select a regeneration resistor or a power supply regenerative circuit having a large capacity in accordance with the magnitude of such excessively regenerated electric power. Unfortunately, depending on such a large capacity, the motor driving device is increased in size, and the cost increased.

For example, according to Japanese Patent Application Laid-Open Publication No. H07-95775 described above, magnitude of electric power regenerated by the motor at the time of regeneration differs depending on specification and operation of the motor. Accordingly, if the motor regenerates excessive electric power, it is necessary to select a regeneration resistor or a power supply regenerative circuit having a large capacity in accordance with the magnitude of such excessively regenerated electric power. Unfortunately, depending on such a large capacity, the cost of the motor driving device is increased.

According to Japanese Patent Nos. 3511173 and 3368930 described above, the regeneration-resistor-protecting circuit that protects the regeneration resistor is additionally provided. Due to the additional regeneration-resistor-protecting circuit, the cost of the motor driving device is unfortunately increased. Particularly, according to Japanese Patent No. 3368930 described above, in addition to the regeneration resistor, the regeneration-resistor-protecting circuit or the like needs to be provided, further increasing the cost of the motor driving device.

SUMMARY

In view of the above-described problems, it is an object of the present invention to provide a motor driving device that has a converter converting an input alternating current into a direct current, and an inverter inverting the direct current output by the converter into an alternating current used for driving a motor, and that can obtain an advantage in that abnormal excessive voltage can be suppressed, control is easy, cost is low, and less space is needed.

In order to accomplish the above-described object, the present invention provides a motor driving device including a converter that converts an input alternating current into a direct current, an inverter that inverts the direct current output by the converter into an alternating current for driving a motor, a voltage detecting unit that detects a voltage on a direct current output side of the converter, and a numerical control unit that performs control causing the inverter to output a reactive current to increase electric power consumed in the motor when a voltage detected by the voltage detecting unit exceeds a predetermined threshold.

According to one aspect of the present invention, the numerical control unit includes a voltage monitoring unit that monitors whether or not a voltage detected by the voltage detecting unit exceeds the predetermined threshold, and a reactive current instructing unit that generates a reactive current instruction for causing the inverter to output a reactive current in accordance with a voltage detected by the voltage detecting unit, when the voltage monitoring unit determines that a voltage detected by the voltage detecting unit exceeds the predetermined threshold.

The predetermined threshold may be set to be lower than a maximum voltage value on the direct current output side allowable for the converter.

The numerical control unit may perform control causing at least one of the inverters to output a reactive current when a voltage detected by the voltage detecting unit exceeds the predetermined threshold.

A limit of a current output from the inverter to the motor may be set to be larger than a limit of a current determined for restricting output torque of the motor.

The numerical control unit may perform control causing the inverter to output a reactive current having a sine-wave-form or rectangular-wave-form when a voltage detected by the voltage detecting unit exceeds the predetermined threshold.

BRIEF DESCRIPTION OF THE DRAWINGS

The present invention will be more clearly understood by referring to the following accompanying drawings.

DETAILED DESCRIPTION

In the following, a motor driving device having a reactive current instruction generating unit is described with reference to the drawings. The present invention is not limited to the embodiment illustrated in the drawings or described below. The motor driving device described below according to the embodiment of the present invention is connected to motors provided for driving drive shafts such as a feed shaft and a main shaft in a machine tool. The number of the motors is the same as that of the drive shafts. In the present embodiment, the machine tool has three drive shafts, and accordingly, three motors are provided for the drive shafts. This number of the drive shafts and the motors is one example, and does not limit the scope of the present invention.

Figure 1:
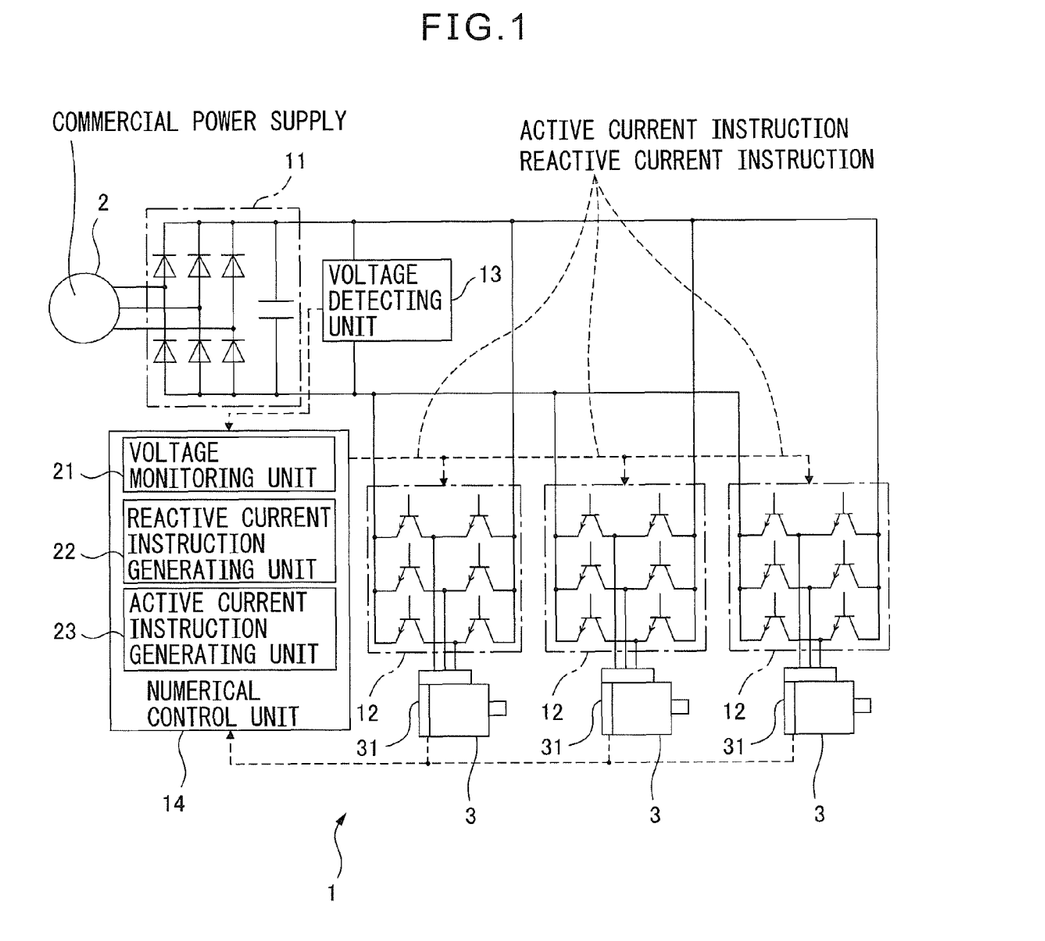
FIG. 1 illustrates a motor driving device according to an embodiment of the present invention.

FIG. 1 illustrates the motor driving device according to the embodiment of the present invention. In the example of FIG. 1, since the machine tool has three drive shafts, three motors 3 are provided, and the motor driving device 1 drives and controls these motors 3.

The motor driving device 1 according to the embodiment of the present invention includes a converter 11, inverters 12, a voltage detecting unit 13, and a numerical control unit 14. The converter 11 converts into a direct current an alternating current input thereto from a commercial three-phase alternating current power supply 2. The inverters 12 invert the direct current output by the converter 11 into alternating currents for driving the motors 3. The voltage detecting unit 13 detects a voltage on the direct current output side of the converter 11. When a voltage detected by the voltage detecting unit 13 exceeds a predetermined threshold, the numerical control unit 14 causes the inverters 12 to output reactive currents. Thereby, the motors 3 consume more electric power.

The converter 11 is configured by a bridge circuit, for example, which includes power semiconductor devices and diodes. The diodes are connected to the power semiconductor devices in an inverse-parallel connection. The converter 11 includes a smoothing condenser that is located on the direct current output side to smoothen the converted direct current voltage. The converter 11 rectifies the entire wave of an alternating current voltage from the commercial three-phase alternating power supply into a direct current voltage by six diodes when electric power is supplied to the motors 3, i.e., when the motors 3 are driven.

Each of the inverters 12 is configured by a bridge circuit, for example, which includes power semiconductor devices and diodes. The diodes are connected with the power semiconductor devices in an inverse-parallel connection. The switching operation of the inverter 12 is controlled by the numerical control unit 14. That is, the control (for example, pulse width modulation control) of turning on and off the power semiconductors in accordance with instructions from the numerical control unit 14 allows the inverter 12 to invert a direct current voltage into an alternating current voltage having a desired wave-form and a desired frequency. The alternating current driving power output by the inverter 12 is supplied to the motor 3 to rotate the motor 3.

The voltage detecting unit 13 detects a voltage on the direct current output side of the converter 11.

The numerical control unit 14 has a function of generating an active current instruction, and a function of generating a reactive current instruction, and outputs an active current instruction and a reactive current instruction to control the switching operation of the power semiconductors in the inverters 12. For these functions, the numerical control unit 14 includes a voltage monitoring unit 21, a reactive current instruction generating unit 22, and an active current instruction generating unit 23. Each of the voltage monitoring unit 21, the reactive current instruction generating unit 22 and an active current instruction generating unit 23 is configured by an arithmetic processor such as a DSP (digital signal processor) or an FPGA (field programmable gate array), for example, and the operation thereof is defined by a software program.

In order to make the motor 3 rotate in accordance with a desired speed (for example, acceleration, deceleration, a constant speed, stop or the like), desired torque or a desired rotor position, the active current instruction generating unit 23 generates an active current instruction that causes the corresponding inverter 12 to output an alternating current having a required wave-form and frequency, on the basis of rotational information such as a speed and a position of the rotor of the motor 3. The rotational information is received from a sensor 31 installed on the motor 3. Such an active current instruction is generated for each of the inverters 12 (i.e., each of the motors 3). The active current instruction generating unit 23 operates independently of the reactive current instruction generating unit 22 described below. For controlling rotational operation of the motors 3, the numerical control unit 14 is required to detect alternating currents to and from the motors 3, rotational speeds of the motors 3, direct current voltages input to and alternating current voltages output from the inverters 12, and the like, and is required to use these detected values for the processes. Other than the sensor 31, the detectors for detecting these values are not illustrated in FIG. 1.

The voltage monitoring unit 21 monitors whether or not a voltage detected by the voltage detecting unit 13 exceeds the predetermined threshold. Detailed operation of the voltage monitoring unit 21 will be described later.

When the voltage monitoring unit 21 determines that a voltage detected by the voltage detecting unit 13 exceeds the predetermined threshold, the reactive current instruction generating unit 22 generates a reactive current instruction for causing the inverters 12 to output reactive currents in accordance with a voltage detected by the voltage detecting unit 13. Detailed operation of the reactive current instruction generating unit 22 will be described later.

The numerical control unit 14 synthesizes the active current instruction generated by the active current instruction generating unit 23 and a reactive current instruction generated by the reactive current generating unit 22. The synthesized current instruction is compared with a triangular-wave carrier signal having a predetermined carrier frequency when PWM (pulse width modulation) control is performed on the inverter 12. Thereby, a PWM switching signal is generated. The generated PWM switching signal is input to the inverter 12 to cause switching operation of the power semiconductor devices in the inverter 12 to be done on the basis of the PWM switching signal.

Figure 2:
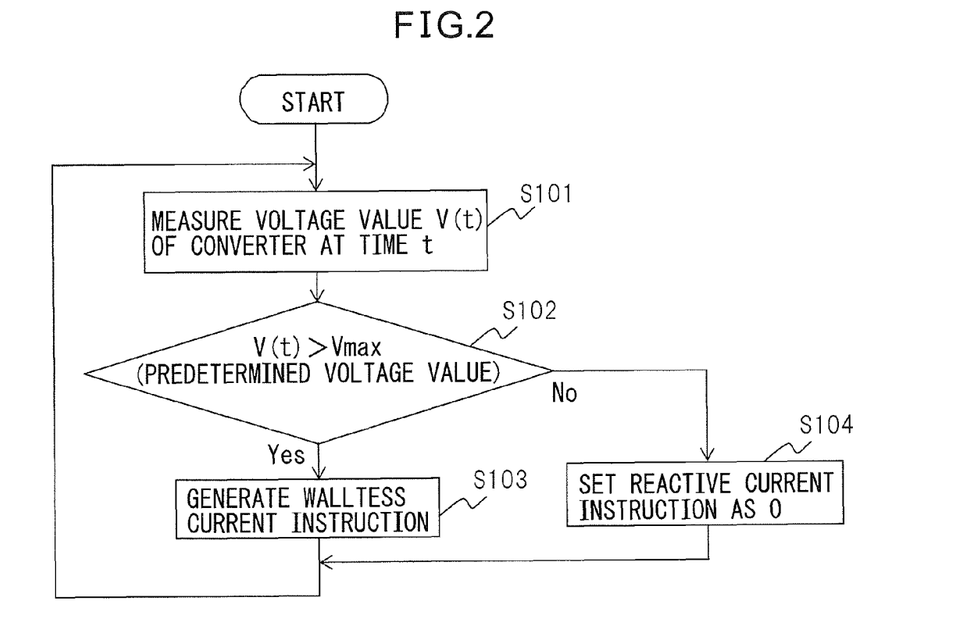
FIG. 2 is a flow chart illustrating an operational flow of a motor driving device according to an embodiment of the present invention.
Figure 3:
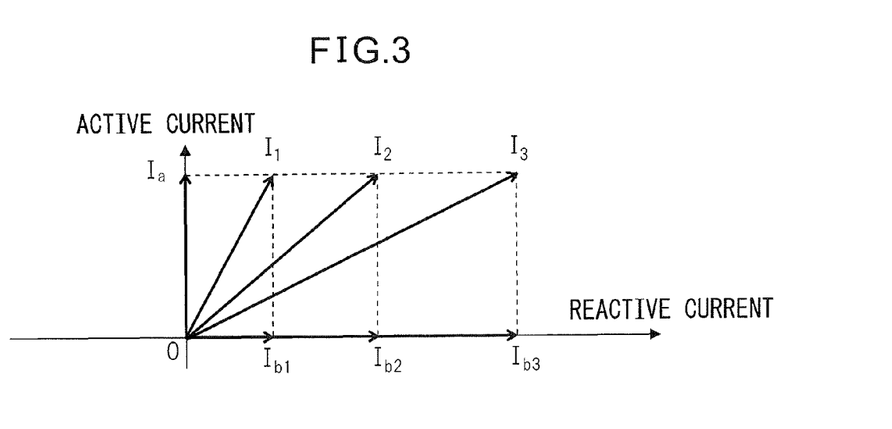
FIG. 3 illustrates relation of an apparent current with an active current and a reactive current.

The next description is directed to operation for suppressing an abnormal excessive voltage by using a reactive current, the operation being performed by the motor driving device 1. FIG. 2 is a flow chart illustrating an operational flow of the motor driving device according to the embodiment of the present invention. FIG. 3 illustrates a relation of an apparent current with an active current and a reactive current.

As described above, electric power regenerated by the motor 3 at the time of control of decelerating the motor 3 raises a voltage on the direct current output side of the converter 11. According to the embodiment of the present invention, when a voltage on the direct current output side of the converter 11 exceeds the predetermined threshold, an active current and a reactive current depending on the voltage are made to flow to increase heat loss in the motor 3. As a result, a rise in a voltage on the direct current output side of the converter 11 is suppressed. An active current from the inverter 12 to the motor 3 contributes to rotational operation of the motor 3, i.e., torque generation of the motor 3. On the contrary, a reactive current from the inverter 12 to the motor 3 does not contribute to torque generation of the motor 3. For example, in FIG. 3, if reactive currents $I_{b1}$, $I_{b2}$ and $I_{b3}$ are added to a constant active current $I_a$, apparent currents (norms) are represented by $I_1$, $I_2$ and $I_3$ respectively. In other words, if a larger reactive current is added to a constant active current, a larger apparent current (norm) is generated. If a larger apparent current flows to the motor 3, the motor 3 consumes more electric power. A reactive current component of an apparent current, however, does not contributes to torque generation of the motor 3, and results in heat loss. That is, increasing or decreasing a reactive current component of an apparent current which flows to the motor 3 allows an adjustment of electric power consumed by the motor 3. According to the embodiment of the present invention, the threshold is predetermined on the basis of the maximum voltage value on the direct current output side allowable for the converter 11. When a voltage on the direct current output side of the converter 11 rises to be larger than the predetermined threshold due to electric power regenerated from the motor 3 at the time of control of decelerating the motor 3, a reactive current in accordance with the voltage detected by the voltage detecting unit 13 is made to flow to the motor 3. In this manner, heat loss in the motor 3 is increased to suppress an excessive voltage rise on the direct current output side of the converter 11. In other words, a reactive current is intentionally made to flow to the motor 3 so that the electric power regenerated by the motor 3 at the time of control of decelerating the motor 3 can be consumed by generating heat loss in the motor 3. FIG. 2 illustrates a concrete operational flow of the motor driving unit 1 according to the embodiment of the present invention.

At the step S101 in FIG. 2, the voltage detecting unit 13 detects a voltage V(t) on the direct current output side of the converter 11 at time t. At the step S102, the voltage monitoring unit 21 in the numerical control unit 14 monitors whether or not the voltage V(t) detected by the voltage detecting unit 13 exceeds the predetermined threshold. When the voltage monitoring unit 21 determines that the voltage V(t) detected by the voltage detecting unit 13 exceeds the predetermined threshold, the reactive current instruction generating unit 22 in the numerical control unit 14 generates a reactive current instruction (step S103). The reactive current instruction causes the inverter 12 to output a reactive current in accordance with the voltage V(t) detected by the voltage detecting unit 13. The larger difference between a voltage detected by the voltage detecting unit 13 and the predetermined threshold means the larger electric power regenerated by the motor 3 at the time of deceleration of the motor 3. Accordingly, at the step S103, the reactive current instruction generating unit 22 generates a reactive current instruction on the basis of the difference between a voltage detected by the voltage detecting unit 13 and the predetermined threshold. Specifically, a reactive current instruction is generated to be a value in proportion to the difference between a voltage detected by the voltage detecting unit 13 and the predetermined threshold. This is because a larger difference between a voltage detected by the voltage detecting unit 13 and the predetermined threshold needs more heat loss in the motor 3. Meanwhile, when the voltage monitoring unit 21 determines that the voltage detected by the voltage detecting unit 13 does not exceed the predetermined threshold, a reactive current instruction is set to be 0 (zero) (step S104). If the step S103 or the step S104 is finished, the flow returns to the step S101, and then, each process described above is repeatedly performed. Thus, according to the embodiment of the present invention, a voltage on the direct current output side of the converter is detected, and if this detected voltage exceeds the predetermined threshold, the inverter is controlled to output a reactive current, so that a reactive current flows to the motor 3, and the consumed electric power in the motor 3 increases. Thereby, an abnormal excessive voltage can be easily suppressed without employing complicated control.

Figure 4:
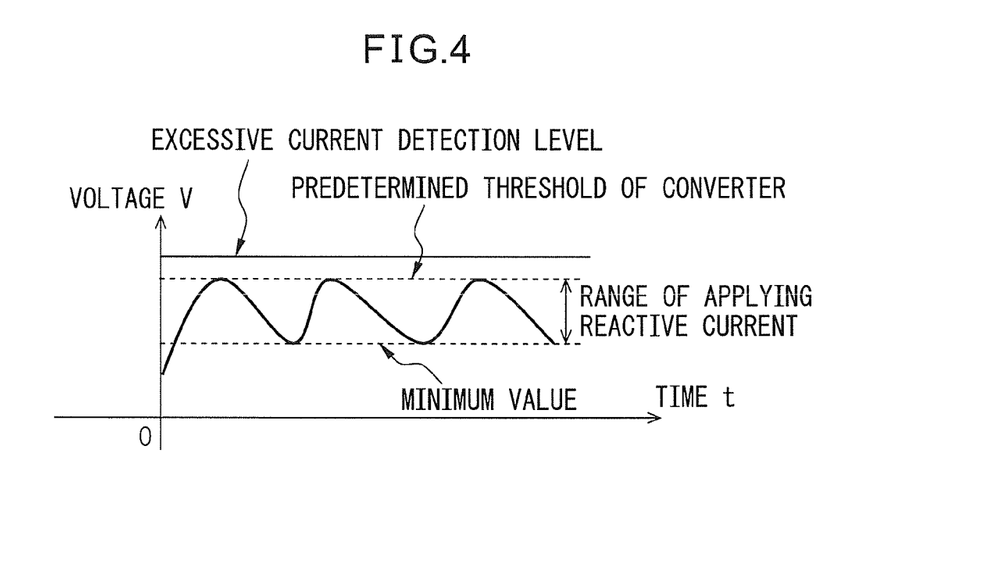
FIG. 4 illustrates setting of a threshold for voltage monitoring in a motor driving device according to an embodiment of the present invention.

FIG. 4 illustrates setting of the threshold for the voltage monitoring in the motor driving device according to the embodiment of the present invention. In the case where a reactive current is made to flow to the motor 3, at the beginning of flowing of a reactive current, a voltage on the direct current output side of the converter 11 overshoots a little. For this reason, in order to secure a margin by taking the above-described overshooting into account, the threshold used by the voltage monitoring unit 21 to monitor a voltage on the direct current output side of the converter 11 is preferably set to be lower than an excessive voltage detection level that is the maximum voltage value on the direct current output side allowable for the converter 11 as illustrated in FIG. 4, instead of being set to be just the excessive voltage detection level. The minimum value of a voltage on the direct output side of the converter 11 that permits a reactive current to flow to the motor 3 may be set. Thereby, existence and absence of a reactive current instruction output by the reactive current instruction generating unit 22 in the numerical control unit 14 can be prevented from being switched to each other in extremely short time. Accordingly, the control can be kept more stable.

Generally, a limit value is set for an output current of the inverter 12 to prevent output torque of the motor 3 from exceeding a limit value. As described above, an active current flowing from the inverter 12 to the motor 3 contributes to rotating operation of the motor 3, that is, torque generation of the motor 3, and on the contrary, a reactive current from the inverter 12 to the motor 3 does not contribute to torque generation of the motor 3. For this reason, the limit value for an output current of the inverter 12 may be set to be larger than the limit value for a current determined for restricting output torque of the motor 3. Thereby, a current larger than the limit value for a output current of the inverter 12 can flow to the motor 3 when a voltage detected by the voltage detecting unit 13 exceeds the predetermined threshold. By such a current margin, a reactive current can flow.

Figure 5:
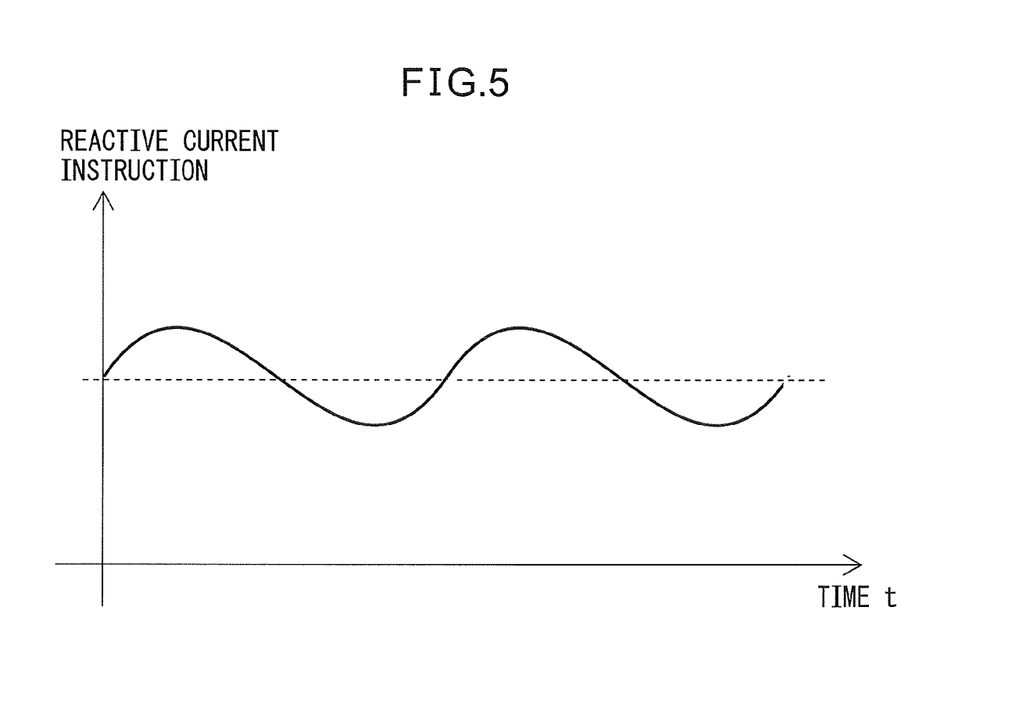
FIG. 5 illustrates a wave-form of a reactive current instruction in a motor driving device according to an embodiment of the present invention, and illustrates a case where a reactive current instruction has a sine-wave-form.
Figure 6:
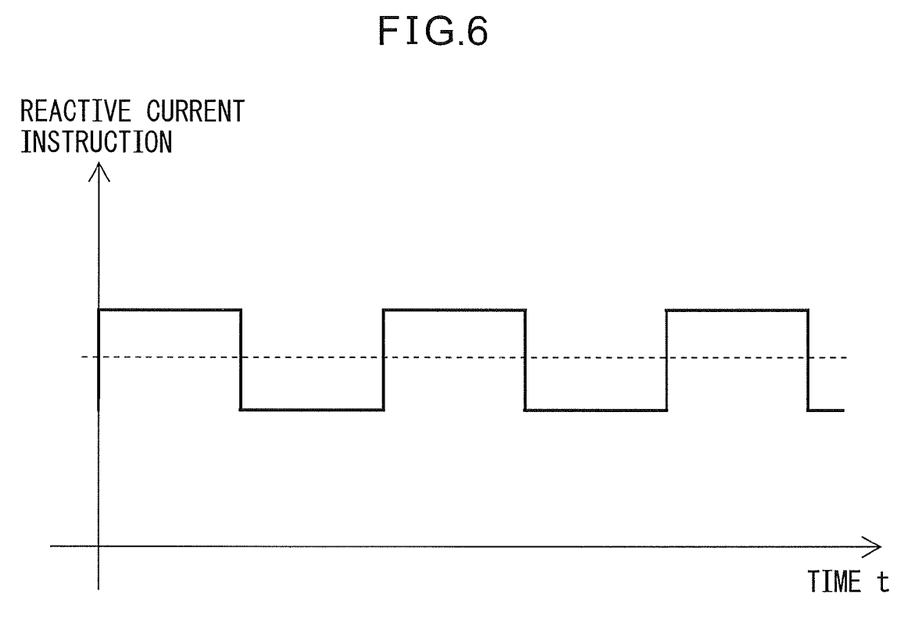
FIG. 6 illustrates a wave-form of a reactive current instruction in a motor driving device according to an embodiment of the present invention, and illustrates a case where a reactive current instruction has a rectangular-wave-form.

FIGS. 5 and 6 illustrate wave-forms of a reactive current instruction in the motor driving device according to the embodiment of the present invention. FIG. 5 illustrates a reactive current instruction having a sine-wave-form, and FIG. 6 illustrates a reactive current instruction having a rectangular-wave-form. As described above, the larger difference between a voltage detected by the voltage detecting unit 13 and the predetermined threshold means larger electric power regenerated at the time of the deceleration of the motor 3. For this reason, in accordance with the difference between a voltage detected by the voltage detecting unit 13 and the predetermined threshold, the reactive current instruction generating unit 22 generates a reactive current instruction. The larger difference between a voltage detected by the voltage detecting unit 13 and the predetermined threshold needs larger heat loss in the motor 3. Accordingly, a reactive current instruction is generated as a value in proportion to the difference between a voltage detected by the voltage detecting unit 13 and the predetermined threshold. Since flow of a reactive current generates reluctance in the motor 3, the reactive current instruction generating unit 22 may generate a reactive current instruction causing the inverter 12 to output a reactive current having a direct current component that is in proportion to the difference between a voltage detected by the voltage detecting unit 13 and the predetermined threshold, and having a high frequency component that has a frequency higher than the resonance frequency of the rotor of the motor 3 and that has a sine-wave-form illustrated in FIG. 5 or a rectangular-wave-form illustrated in FIG. 6. Thereby, it is possible to produce a state where average of reluctance torque of the motor 3 is regarded as 0 (zero) from the standpoint of a long period. For the sake of simple drawings, FIGS. 5 and 6 illustrate, in contrast with a reactive current instruction having a constant value (illustrated by the broken lines in the drawings) based on the difference between a voltage detected by the voltage detecting unit 13 and the predetermined threshold, reactive current instructions that have a sine-wave-form and a rectangular-wave-form so as to increase and decrease from the constant value.

The motor driving device 1 described with reference to FIG. 1 is provided with the three motors 3 and the three inverters 12 corresponding to these motors 3 since the number of the drive shafts of the machine tool is three as one example. When a voltage detected by the voltage detecting unit 13 exceeds the predetermined threshold, the numerical control unit 14 performs control causing the inverter 12 to output a reactive current. Such control may be performed on at least one of a plurality of the inverters. For example, in the example of FIG. 1, the numerical control unit 14 may perform the above-described reactive current output control on any one of the three inverters 12, or perform the above-described reactive current output control on any two or all three of the three inverters 12. If the above-described reactive current output control is performed on any two or all three of the three inverters 12, the numerical control unit 14 performs control causing the inverters 12 to output equal reactive currents, or performs weighting control such that one of the inverters 12 is caused to output a reactive current larger than a reactive current output by another of the inverters 12.

Each of the voltage monitoring unit 21, the reactive current instruction generating unit 22, and the active current instruction generating unit 23 in the numerical control unit 14 is configured by an arithmetic processor such as a DSP or an FPGA for example, and the operation thereof is defined by a software program. Accordingly, if operational conditions or the like of the motor driven by the motor driving device 1 are changed to increase electric power regenerated by the motor, the program of the numerical control unit 14 can be changed to deal with such change of the operational conditions or the like of the motor. For this reason, change of the operational conditions or the like of the motor driven by the motor driving device 1 can be dealt with flexibly and promptly. As a result, an economical burden and time required for a user can be reduced.

The present invention can be applied to a case where a machine tool system includes motors provided for drive shafts of a machine tool respectively, and these motors (servomotors) are driven by a motor driving device including a converter that converts an input alternating current into a direct current, and inverters that invert the direct current output from the converter into alternating currents supplied as driving electric power for the motors respectively.

According to the present invention, in a motor driving device including a converter that converts an input alternating current into an direct current, and an inverter that inverts the direct current output from the converter into an alternating current for driving a motor, a voltage detecting unit detects a voltage on the direct current output side of the converter, and if a voltage detected by the voltage detecting unit exceeds a predetermined threshold, the inverter is controlled to output a reactive current, so that the reactive current flows to the motor to increase electric power consumed by the motor. Accordingly, an abnormal excessive current can be easily suppressed without employing complicated control. The present invention eliminates necessity of additionally providing a regeneration resistor, a power supply regenerative circuit, a regeneration-resistor-protecting circuit and the like. For this reason, the present invention can realize a compact motor driving device with low cost.

For example, according to the related art additionally providing a regeneration resistor and a power supply regenerative circuit, if operational conditions or the like of a motor driven by a motor driving device are changed to increase electric power regenerated by the motor, it may be required to change a design of the regeneration resistor and the power supply regenerative circuit depending on the increase of the regenerated electric power. Thus, a user suffers an economical burden and time required for large-scale modification of a motor driving device, change of installation layout and so on. On the contrary, according to the present invention, a regeneration resistor, a power supply regenerative circuit and the like do not need to be provided additionally, and program modification for a numerical control unit can deal with the above-described change. Accordingly, it is possible to flexibly and promptly deal with change of operational conditions or the like of a motor driven by a motor driving device, and reduce an economical burden and time required for such change.

The invention claimed is:

1. A motor driving device, comprising:
a converter configured to convert an input alternating current into a direct current;
a plurality of inverters connected to the converter in parallel and each configured to invert the direct current output by the converter into an alternating current for driving each of a plurality of motors respectively connected to the plurality of inverters;
a voltage detecting unit configured to detect a voltage on a direct current output side of the converter; and
a numerical control unit connected to the plurality of inverters in parallel and configured to cause at least one of the plurality of inverters to output a reactive current, when the voltage detected by the voltage detecting unit exceeds a predetermined threshold which is smaller than a maximum voltage value on the direct current output side allowable for the converter, wherein
the numerical control unit includes
a voltage monitoring unit configured to monitor whether or not the voltage detected by the voltage detecting unit exceeds the predetermined threshold, and
a reactive current instruction generating unit configured to generate a reactive current instruction for causing the at least one of the plurality of inverters to output the reactive current on the basis of a difference between the voltage detected by the voltage detecting unit and the predetermined threshold when the voltage monitoring unit determines that the voltage detected by the voltage detecting unit exceeds the predetermined threshold.

2. The motor driving device according to claim 1, wherein a limit value of a current output from the inverter to the motor is higher than a limit value of a current set for restricting output torque of the motor.

3. The motor driving device according to claim 1, wherein the numerical control unit causes the inverter to output the reactive current having a sine-wave-form or a rectangular-wave-form when the voltage detected by the voltage detecting unit exceeds the predetermined threshold.

4. The motor driving device according to claim 1, wherein the reactive current instruction generating unit is configured to generate the reactive current instruction for causing the at least one of the plurality of inverters to output the reactive current in proportion to the difference between the voltage detected by the voltage detecting unit and the predetermined threshold when the voltage monitoring unit determines that the voltage detected by the voltage detecting unit exceeds the predetermined threshold.

* * * * *